R. W. PITTMAN.
APPARATUS FOR REFINISHING OR RETOUCHING THE TEETH OF SAW BLADES.
APPLICATION FILED JUNE 26, 1918.
1,378,611.
Patented May 17, 1921.
3 SHEETS—SHEET 2.
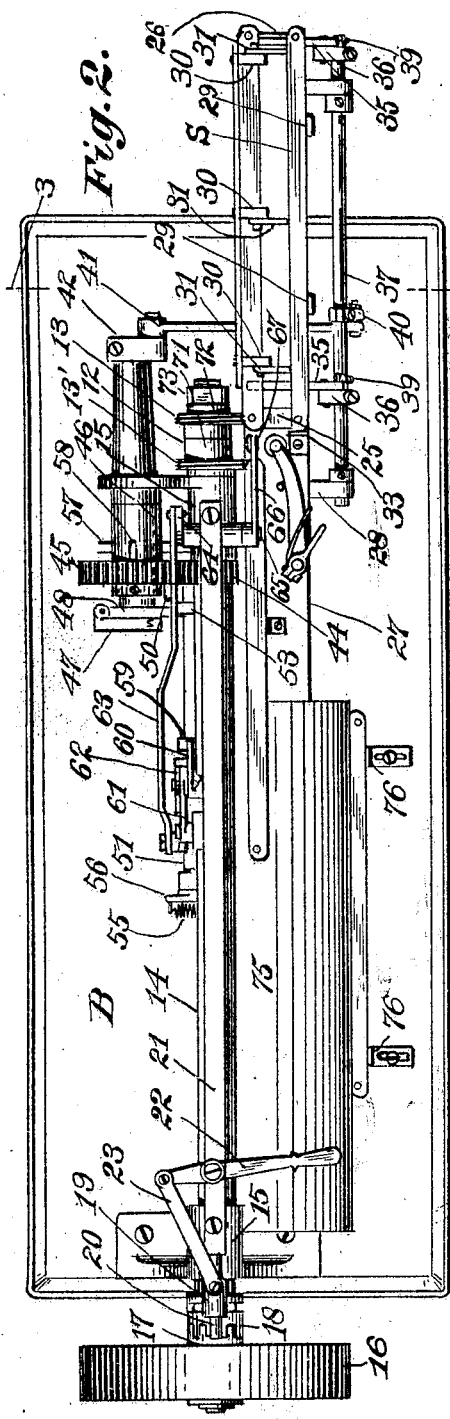
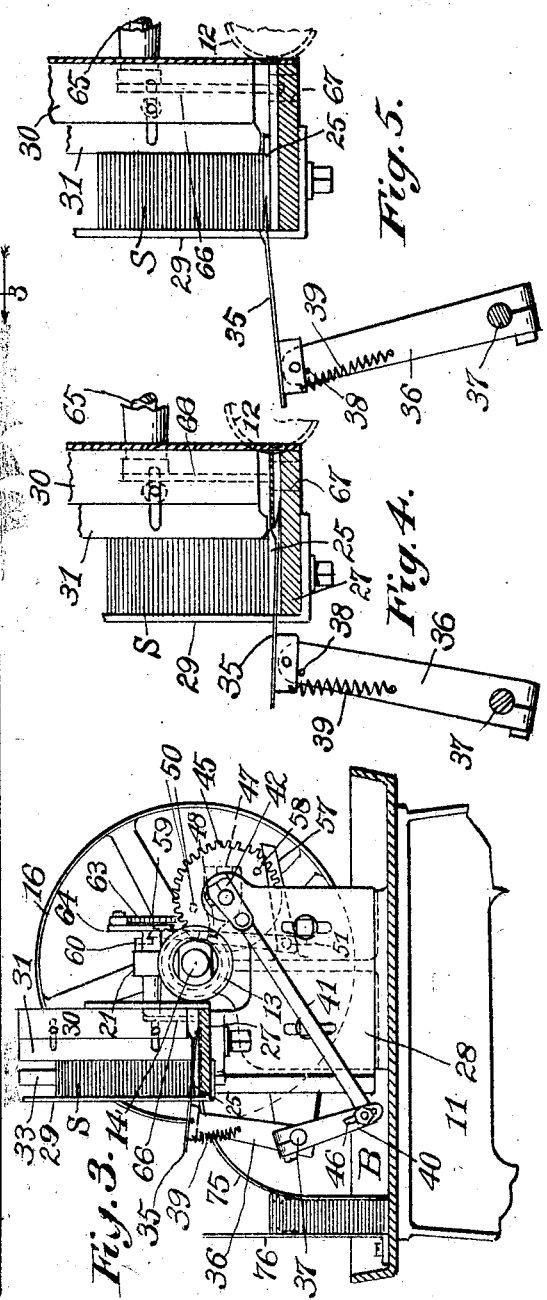
Inventor
Reinhart W. Pittman.
By his Attorney

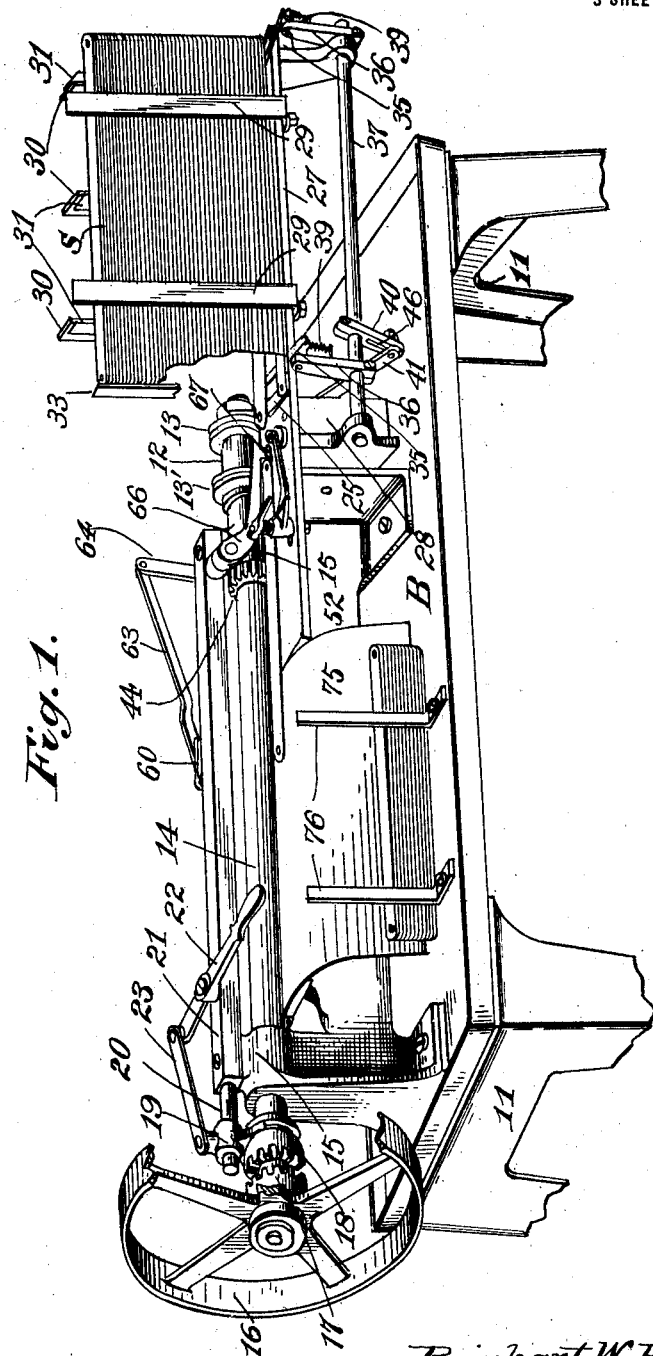

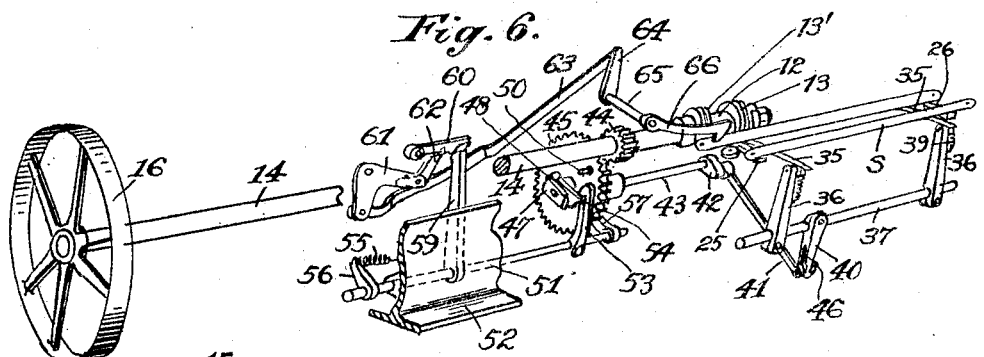

UNITED STATES PATENT OFFICE.

REINHART W. PITTMAN, OF NEW YORK, N. Y., ASSIGNOR TO ALSTON SAW & STEEL COMPANY, OF NEW YORK, N. Y., A CORPORATION OF PENNSYLVANIA.

APPARATUS FOR REFINISHING OR RETOUCHING THE TEETH OF SAW-BLADES.

1,378,611.     Specification of Letters Patent.    Patented May 17, 1921.

Application filed June 26, 1918. Serial No. 241,926.

*To all whom it may concern:*

Be it known that I, REINHART W. PITTMAN, a citizen of the United States, and a resident of the borough of Manhattan, in the city, county, and State of New York, have invented new and useful Improvements in Apparatus for Refinishing or Retouching the Teeth of Saw-Blades, of which the following is a specification.

This invention relates to machines to retouch or finish cutting the teeth of hack saw blades, as by filing, to sharpen or complete the cutting of the teeth, and it is the primary object of the invention to provide a machine of this character which is simple and cheap in construction and efficient in operation.

In the cutting of teeth on blanks in the production of hack saws in a milling machine a plurality of blanks or blades are clamped in a chuck in the milling machine and the teeth cut by a gang mill crossing the blanks. It frequently happens in the cutting of the teeth in this manner that the blanks or blades are removed from the chuck before the teeth are fully cut or formed, due to not thoroughly inspecting the teeth before the blades are removed from the chuck, or to not accurately placing the blanks in the chuck. As it is impossible to reclamp the blades accurately in the chuck to correct this error in the cutting of the teeth and in order that the material of the blanks or blades will not be wasted, the teeth are refiled, and it is the principal object of the invention to provide a machine for this purpose and combine therewith means to support a pile of blades or blanks to be operated upon, together with means to successively feed the blades from the pile to the means or file to operate upon the same, and to control the actuation of said means and feeding of the blanks by a blade which is being operated upon.

A further object of the invention is to provide means to which the blades are directed as they are delivered from the filing means to automatically assemble the blades in a superposed pile.

Other objects and advantages will hereinafter appear.

In the drawings accompanying and forming a part of this specification, Figure 1 is a perspective view of an apparatus illustrating an embodiment of my invention with portions of the supporting standards broken away.

Fig. 2 is a plan view showing the blank or blade feeding means in position with a blade being fed to the means to operate upon the same.

Fig. 3 is a cross sectional view taken substantially on the line 3—3 of Fig. 2 looking in the direction of the arrows and showing the parts in the same position as in Fig. 2.

Fig. 4 is an enlarged sectional detail view of the means to control the actuation of the blade feeding means by a blade being operated upon.

Fig. 5 is an enlarged sectional detail of the means to feed a blade from the pile.

Fig. 6 is a perspective view of the mechanism to feed a blade to the means to operate upon the same and the means to control the actuation thereof.

Fig. 7 is an enlarged longitudinal sectional view, and Fig. 8 a front elevation of details of the controlling means for the blade feeding actuating means.

Fig. 9 is an enlarged sectional view of the means or file to operate upon the blades; and Fig. 10 is a perspective view showing in a diagrammatic manner the method of operating upon the teeth of a blade.

Similar characters of reference designate like parts throughout the different views of the drawings.

In the embodiment of the invention shown in the drawings the operative mechanism is mounted upon a bed B supported by standards 11, only a portion of which are shown. The blanks or blades S are operated upon to cut or to finish the cutting of teeth on the blanks by a rotatable tool consisting of a head 12 having a pair of ribs or worms 13, 13' with file teeth formed thereon, these file portions being spaced apart for a purpose to be hereinafter described. The head is removably secured to a shaft 14 journaled in brackets 15 mounted upon the bed B, and driven from a suitable source of power by a pulley 16. The pulley 16 is loose upon the shaft, and the shaft and thereby the tool 12 is connected thereto and thereby to the power by a clutch, one member 17 of which is connected to the pulley and the other clutch member 18 mounted on the shaft to rotate therewith and have sliding movement thereon. The latter clutch member is thrown into and out of operative engagement with its companion clutch member 17 by a bifurcated arm 19 engaging in an annular recess in the clutch member 18, the arm being slidably mounted upon a support 20 adjustably secured in one end of a bar 21 carried upon the bearings for the shaft 14, and movement imparted to said arm 19 by a hand lever 22 pivotally supported upon the bar 21 and connected to the arm 19 by a link 23.

The blanks or hack saw blades S to be operated upon are supported in a superposed pile upon supports 25, 26 secured to a longitudinally extending portion 27 of a bracket 28 mounted upon the bed and maintained in piled relation by engaging between posts 29 and 30 secured to the support 27 to engage at the front and rear edges of the blades, the posts 30 adjustably carrying gage portions 31 to increase and decrease the space between the posts to accommodate the same for different width blades, the lower ends of said gage portions and the parts of the posts 30 to which they are secured being spaced from the support 27, as shown in Fig. 3, for the engagement of the saw blade as it is fed from the bottom of the pile and to permit of the moving of the blade along said support in a manner and for a purpose to be hereinafter set forth.

At the front end of the pile of blades there is provided a gage 33 for the leading ends of the blades. It will be noted that there is no post at the end of the support 27 opposite to the gage 33 and whereby to adapt the same for blades of different lengths.

The feeding means to feed the blades successively from the bottom of the pile to the tool 12 comprises fingers 35, one adjacent each end of the pile, said fingers being made of flat yielding material and pivotally carried at the upper ends of arms 36 fixed to a rock shaft 37 journaled in arms extending from the support 27, 28. The forward or free ends of the fingers are normally yieldingly urged upward to a predetermined position with the support of the finger to engage a stop pin 38 projecting from the arms 36 by springs 39. As the shaft 37 is rocked to move the fingers forward, the forward ends of the fingers will engage the back of the lowermost blade of the pile and move it forward from the pile and below the gage portions 31 and the parts of the posts 30 carrying the same, this space being so proportioned as to permit the passage of a single blade and the gage portions 31 serving as an abutment or stop for the next adjacent blade. The support at the leading end of the blades is cut away so as to leave a space between the file 13 of the tool and the end of said support and into which space the leading end of the fed blade will drop as it is fed from the pile and be supported by the extension 27 of the bracket support 28, and due to the gage post 33 will be guided to position for the file 13 to engage the first teeth of the blade as shown at S' in Fig. 2. The end of the support 25 also serves as an abutment edge for the back edge of the blade being operated upon by the tool. The tool rotates continuously and as it engages with the first tooth of the fed blade it will not only operate upon the tooth but due to its spiral formation will operate to advance the blade longitudinally. The spiral file 13 is arranged so that it will engage alternate teeth of the blade, and the spiral file 13' is arranged to engage and operate upon the teeth which are alternate with the teeth operated upon by the file 13 and whereby it is possible to form a sharp cutting edge or point on the tooth.

The blade feeding actuating means is operable from the actuating means for the tool, and comprises an arm 40 fixed to the rock-shaft 37 pivotally connected to a link 41 having a crank connection 42 with a shaft 43 which is driven from the tool carrying shaft 14 by a pinion 44 meshing with a gear 45 operatively connected to the shaft 43. The link 41 has a pin and slot connection with the arm 40, as shown at 46, whereby the connection between said link and arm may be adjusted to regulate the movement of the rock shaft 37 and thereby the movement of the feeding fingers 35 to adapt the same to feeding of blades of different widths.

It will be obvious that if the rock-shaft 37 were continuously rocked the feeding fingers would be operated to feed blades to the tool before the tool had finished operating upon a blade previously fed thereto. To obviate this, means are provided to intermittently connect the actuating means for the feeding fingers to the tool actuating means only at such time as a blade has been delivered by the tool and to maintain the blade feeding means inoperative as a blade is being operated upon by the tool. For this purpose the gear 45 is rotatably mounted on the bearing support 46 for the shaft 43 and continuously driven by the pinion 44, and clutch mechanism is provided to operatively connect the gear to said shaft 43 (Fig. 7), comprising a cross-head 47 fixed to the end of the shaft 43 projecting through the gear 45, to one end of which head an arm 48 is pivotally connected at one end, the opposite end of the arm being normally urged by a spring 49 in a direction toward the gear 45 to be engaged by a pin 50 extending laterally from the gear. It will be obvious that as the gear is rotated and the pin 50 engages with the arm 48 that the shaft 43 will be rotated with the gear, thereby transmitting movement to the rock-shaft 37 and the connected feeding fingers 35.

To maintain the feeding fingers inoperative while a blade is being operated upon by the tool 12, means are provided operable from a blade being operated upon to maintain the arm 48 out of the path of movement of and out of engagement with the gear pin 50. For this purpose there is provided a rock-shaft 51 journaled in an extension 52 of the support for the shaft journal 15 at the right hand end of the shaft 14, said shaft carrying a latch 53 to coöperate with a beveled portion 54 of the arm 48. The shaft 51 is normally urged in a direction to release the latch 53 from the arm 48 by a spring 55 connected at one end to an arm 56 fixed to the shaft and the other end connected to a fixed part. To prevent repeated actuation of the feeding fingers, as when a blade has been fed to the tool 12 and is being operated upon thereby, a second arm 57 is fixed to the shaft 51 to engage at the side of the gear 45 opposite to the clutch arm 48. As the shaft is rotated and just previous to the engagement of the gear pin 50 with the arm 48, a pin 58 projecting from the opposite side of the gear 45 will engage with the arm 57 thereby rocking the shaft 51 and moving the latch 53 to position to engage with and throw the arm 48 out of the path of movement of the pin 50 and hold it in such position until the gear pin 50 has passed the arm 48.

To retain the shaft in position with the latch maintaining the arm 48 normally in position and out of the orbit of movement of the gear pin 50 there is fixed to the shaft 51 an arm 59. As the shaft is moved to cause the latch 53 to move the arm 48 out of the path of movement of the gear pin 50 by the engagement of the gear pin 58 with the arm 57, this arm 59 is moved to position to engage in back of a gravity latch 60 pivotally carried by the bar 21. Means are provided operable to permit this latch 60 to engage the arm 59 by a blade and during the time that the tool 12 is operating upon such blade, and automatically operative as the blade is delivered by the tool to move the latch 60 to position to release the arm 59 and cause the shaft 51 to be rocked by the spring 55 to release the clutch arm 48 to engage with the gear pin 50 to operatively connect the feeding fingers to its actuating means. This actuating means for the latch 60 (Fig. 8) comprises a bell-crank lever 61 pivotally carried by the bar 21, said lever carrying at one end a pawl 62 to coöperate with the latch 60 and the other arm of the lever connected by a link 63 with an arm 64 fixed to a rock-shaft 65 (Fig. 6), said shaft also having fixed thereto an actuator 66 having a part to engage in the path of movement of a blade being operated upon by the tool 12. This actuator is in the nature of a spring influenced arm having a part which in normal idle position, as when a blade is not being operated upon by the tool, engages in a recess or opening 67 in the blade guide 27 (Fig. 4) and thereby holds the latch 60 through its connected parts with the actuator in released position as shown in dotted lines in Fig. 8. However, as a blade being operated upon is fed by the tool 12 the blade in its movement will engage with and move the actuator to position so that the actuator will engage with and be supported by the blade as it is being operated upon as shown in Fig. 4 and hold the actuating parts for the latch 60 in position so that said latch may engage the arm 59, as shown in Fig. 6. As soon as a blade is delivered from the tool the actuator will again drop by gravity and operate to actuate the means for the latch 60 to throw said latch to position to release the arm 59 and permit the clutching of the blade feeding means to its actuating means as hereinbefore set forth.

As stated the tool comprises a pair of spirally formed files so arranged that the one file, as 13′, will operate upon alternate teeth of the blade as indicated at a in Fig. 10, while the other file 13 will operate upon the teeth of the blade, indicated at b in Fig. 10, alternating with the teeth a. To facilitate the substitution of files to operate upon blades having different pitch teeth the files may be mounted upon a sleeve 70 having a shoulder at one end with washers 71 between the respective files and retained thereon by a nut 72 threaded onto the end of the sleeve, and this sleeve with the files mounted on the reduced end of the shaft 14 and retained thereon by a nut 73 threaded onto the end of the shaft.

The blades as they are operated upon by the tool 12 move along a portion of the support 27 extending forward of the end of the pile of blades, and as the blades are delivered from the tool they are directed along the upper portion of a guide 75 consisting of a curved plate connected at its lower end to the bed B and the upper end secured to form a continuation of the guide support 27, or it may be constructed integral therewith. The blades as they are delivered to this chute will slide down the chute to engage in a space between said chute and vertical posts 76 fixed to the bed and be directed by the chute to be assembled in a superposed pile in said space, Figs. 1 and 3.

The tool or file after being turned up and formed with the file teeth in order to make it operate efficiently is hardened, and during the hardening it is practically impossible to retain the tool in its true form, portions thereof being distorted by one portion expanding or contracting more or less than other portions due to the inequalities in the metal of which it is made. Should a saw being operated upon by the tool be maintained rigidly in operative contact with the tool, such distorted portion of the tool would operate to form uneven teeth, or the tool might be injured by being suddenly and forcibly brought into contact with the blade. To obviate this, means are provided to yieldingly maintain the blade in engagement with the tool, comprising a roller 80, carried by an arm 81 pivotally mounted on a stud 82, to engage with the back edge of a blade at a point substantially midway between the file portions 13 and 13' of the tool. The arm is yieldingly urged in a direction toward the tool by a spring 83 carried by an arm 84 secured to the stud 82. To increase or decrease the force with which the roller 80 engages the saw blade the spring carrying arm 84 is arranged to be adjusted on the stud 82 to increase or decrease the tension of the spring 83.

Having thus described my invention, I claim:

1. The combination of a support for a pile of toothed blades; means to operate upon the teeth of a blade; means operable to feed a blade from the pile and present the blade to the means to operate upon the teeth thereof; means to actuate said blade feeding means normally inoperative and operable to cause the blade feeding means to be actuated as a blade is delivered from the means to operate upon the teeth thereof.

2. The combination of a support for a superposed pile of toothed blades, means to feed the lowermost blade from the pile and present it to a rotatable tool and by said tool longitudinally advanced as it is being operated upon by said tool, said blade feeding means being normally inoperative; actuating means for said feeding means; and means operable to connect the blade feeding means to its actuating means and actuate the same as a blade is delivered from the tool to operate upon the teeth of the blade.

3. The combinaton of a support for a pile of blades; means to operate upon said blades; means to successively feed the blades from the pile and present them to the means to operate upon the same; means to actuate said blade feeding means; and means operable by a blade as it is being operated upon to disconnect said feeding means from its actuating means and to connect said feeding means and actuating means as a blade is delivered from the means to operate upon the same.

4. The combination of a support for a pile of saw blades; means to operate upon the teeth of said blades; means to feed the blades from the pile to the means to operate upon the same; and means to which the blades are directed as they are delivered from the means to operate upon the same to assemble the blades in a superposed pile.

5. The combination of a support for a pile of saw blades; a rotatable tool to which the blades are fed from the pile to operate upon the teeth of the blades; means to drive said tool; means operable from the driving means for the rotatable tool to successively feed the blades from the pile and present them to the rotatable tool; and means operable to disconnect the feeding means from the driving means for the tool as a blade is being operated upon by the tool and operatively connected thereto as a blade is delivered from the rotatable tool for the purpose specified.

6. The combination of a support for a pile of saw blades; a rotatable tool to which the blades are fed from the pile to operate upon the teeth of the blades and longitudinally advance the same; means operable from the driving means for the rotatable tool to successively deliver the blades from the pile and present them to the rotatable tool arranged to be disconnected from the tool driving means as a blade is being operated upon by the tool and automatically operable to connect said blade feeding means to the tool driving means as a blade is delivered from the tool.

7. The combination of a support for a pile of saw blades; a rotatable tool to which the blades are fed from the tool to operate upon the teeth of the blades; means to successively feed the blades from the pile to the tool; and means to prevent actuation of said blade feeding means as a blade is being operated upon by the tool.

8. The combination of a support for a pile of saw blades; a rotatable tool to which the blades are fed from the pile to operate upon the teeth of the blades; means to successively feed the blades from the pile and present them to the tool; actuating means for said feeding means; means operable by a blade as it is being operated upon by the tool to disconnect the blade feeding and actuating means and automatically operable to operatively connect the blade feeding with its actuating means as a blade is delivered from the tool; and means to prevent the actuation of said blade feeding means while connected to its actuating means and a blade is being operated upon by the tool.

9. The combination of a rotatable tool; a support for a pile of saw blades from which the blades are fed to the rotatable tool to be operated upon by the latter, said support having a gage for the leading ends of the blades to guide a blade as it is fed from the pile to the tool; reciprocable fingers operable to feed the lowermost blade from the pile to the tool; means to actuate said fingers; a clutch between said feeding fingers and its actuating means normally out of engagement to maintain the feeding fingers inoperative as a blade is being operated upon by the tool and caused to be thrown into operative engagement as a blade is delivered from the tool to actuate the feeding fingers for the purpose specified.

10. The combination of a support for a pile of saw blades; means to operate upon said blades and simultaneously longitudinally advance the same; reciprocable fingers to feed the blades from the pile; means to actuate said fingers including a clutch, one clutch member of which is movable relative to the other and normally urged to operative position; and means to hold said clutch member in inoperative position and thereby prevent the operation of the feeding fingers operable by a blade as it is being operated upon by the means to operate upon the same.

11. The combination of a support for a pile of saw blades; means to which the blades are fed from the pile to operate upon the blades and simultaneously advance the same longitudinally; reciprocable fingers to feed the blades from the pile; means to actuate said fingers including a clutch normally urged to operative engagement; means operable after a blade has been fed from the pile to move one of the clutch members out of engagement with the other clutch member and hold it in such position while a blade is being operated upon and released to permit said clutch member to move into operative engagement with the other clutch member and actuate the feeding fingers as a blade is delivered from the means to operate upon the same.

12. The combination of a support for a pile of saw blades; means to which the blades are fed from the pile to operate upon the same; reciprocable fingers to feed the blades from the pile; means to actuate said fingers including a clutch normally urged to clutching position; means operable after a blade has been fed from the pile to move the clutch mechanism to inoperative position; means to lock the clutch member in such position having a part to be engaged by and held in locking position by a blade as it is being operated upon, and said part being operable to release the clutch locking means to permit the clutch mechanism to move to operative position and actuate the feeding fingers as such blade is delivered from the means to operate upon the same.

13. The combination of a support for a pile of saw blades; means to which the blades are fed from the pile to operate upon the same and simultaneously longitudinally advance the blade; and means to feed the blades successively from the pile, comprising reciprocable fingers to engage with and move the lowermost blade from the pile, a rock shaft carrying said fingers, a continuously rotating clutch member, a rotatable shaft having a crank connection with said rock shaft, a clutch member connected to said shaft and normally urged to position to operatively engage with the continuously rotating clutch member, and means to throw said latter clutch member to inoperative position after a blade has been fed from the pile and hold it in such position while said blade is being operated upon, and operable to release said clutch member to permit it to move into operative connection with the continuously rotating clutch member to actuate the reciprocable fingers after the blade has been delivered from the means to operate upon the same.

14. The combination of a support for a pile of saw blades; means to which the blades are fed from the pile to operate upon the same and simultaneously longitudinally advance the blade; and means to feed the blades successively from the pile, comprising reciprocable fingers to engage with and move the lowermost blade from the pile, a rock shaft carrying said fingers, a continuously rotating clutch member, a rotatable shaft having a crank connection with said rock shaft, a clutch member connected to said shaft and normally urged to position to operatively engage with the continuously rotating clutch member, and a pawl movable to position to engage with and hold the clutch member connected to the shaft out of engagement with its coöperating clutch member after a blade has been fed from the pile and maintained in such position until the delivery of the blade from the means to operate upon the same.

15. The combination with a support for a pile of blades and means to which the blades are fed from the pile to operate upon the same and simultaneously longitudinally advance the blade, of reciprocable fingers operable to feed the lowermost blade from the pile; a rock shaft carrying said fingers; a continuously rotating clutch member; a rotatable shaft having a connection with the rock shaft; a clutch member connected to said shaft and normally urged to position to operative engagement with the continuously rotating clutch member; a pawl movable to position to engage with and hold said latter clutch member in inoperative position while a blade is being operated upon and operable to release said clutch member after a blade has been delivered from the means to operate upon the same for the purpose specified.

16. The combination with a support for a pile of saw blades and means to which the blades are fed from the pile to operate upon the same and simultaneously longitudinally advance the blade, of reciprocable fingers operable to feed the lowermost blade from the pile; a rock shaft carrying said fingers; a continuously rotating clutch member; a rotatable shaft operatively connected with the rock shaft; a clutch member connected with said shaft and normally urged to position to operative engagement with the continuously rotating clutch member; a pivotally supported pawl operable from the continuously rotating clutch member after the feeding fingers have been actuated to feed a blade from the pile to engage with the clutch member connected to the rotatable shaft to move it out of engagement with the continuously rotating clutch member; and means operable by a blade as it is being operated upon to maintain the pawl in clutch releasing position and operable to release the pawl to permit said clutch member to move to clutching position when the blade is delivered from the means to operate upon the same.

17. The combination with a support for a pile of blades and means to which the blades are fed from the pile to operate upon the same and simultaneously longitudinally advance the same, of reciprocable fingers operable to feed the lowermost blade from the pile; a rock shaft carrying said fingers; a continuously rotating clutch member; a rotatable shaft operatively connected to the rock shaft; a clutch member connected to said shaft and normally urged to position to operatively engage with the continuously rotated clutch member; a second rock shaft; a pawl carried by said latter shaft to engage with the clutch member connected to the rotatable shaft to move it to inoperative position; a spring to normally urge the second rock shaft to position with the pawl out of engagement with said clutch member to permit the clutch to move to clutching position; an arm mounted on said second rockshaft and operable from the continuously rotating clutch member to move the one clutch member out of clutching engagement after the feeding fingers have been actuated and the blade fed from the pile; and means to retain the rock-shaft in position with the pawl in clutch releasing position as a blade is being subjected to the means to operate upon the same and releasable when a blade is delivered from said means to operate upon the same to permit one clutch member to move to clutching position for the purpose specified.

18. The combination with a support for a pile of blades and means to which the blades are fed from the pile to operate upon the same and simultaneously longitudinally advance the same, of reciprocable fingers operable to feed the lowermost blade from the pile; a rock shaft carrying said fingers; a continuously rotating clutch member; a rotatable shaft operatively connected to the rock shaft; a clutch member connected to said shaft and normally urged to position to operatively engage with the continuously rotating clutch member; a second rock shaft; a pawl carried by said latter shaft to engage with the clutch member connected to the rotatable shaft to move it to inoperative position; a spring to normally urge the second rock shaft to position with the pawl out of clutching position; an arm mounted on said second rock shaft and operable from the continuously rotating clutch member to move the one clutch member out of clutching engagement after the feeding fingers have been actuated and a blade fed from the pile; an arm fixed to the second rock shaft; a latch to coöperate with said arm to hold the shaft in position with the pawl in position to maintain the one clutch member out of operative engagement with the other clutch member; and means to release said latch including an actuator to engage a blade as it is being operated upon to retain the latch in latching position and operable as a blade is delivered from the means to operate upon the same to release said latch for the purpose specified.

19. The combination of a rotatable shaft carrying a tool; a support for a pile of saw blades; reciprocable fingers to feed the blades successively from the pile to the tool to be operated upon; means to actuate said feeding fingers including clutch mechanism, one member of which clutch is continuously driven from the tool shaft and the other connected to the feeding fingers; and means to throw said latter clutch member to unclutching position after a blade has been fed from the pile and retained in such position while the blade is being operated upon, and to throw said clutch member to clutching position when a blade is delivered from the means to operate upon the same, for the purpose specified.

REINHART W. PITTMAN.